Sept. 24, 1946.  M. G. GRABOWSKY  2,408,308
METHOD OF MAKING NET
Original Filed May 24, 1943

Inventor
Murray G. Grabowsky
by Parker & Carter,
Attorneys.

Patented Sept. 24, 1946

2,408,308

UNITED STATES PATENT OFFICE 2,408,308

METHOD OF MAKING NET

Murray G. Grabowsky, Chicago, Ill., assignor to R. J. Ederer Company, Chicago, Ill., a corporation of Illinois Original application May 24, 1943, Serial No. 488,176, now Patent No. 2,357,890, dated September 12, 1944. Divided and this application May 18, 1944, Serial No. 536,094

11 Claims. (Cl. 28—77)

This invention relates to a method for making a net, and particularly to a method for making a tennis net or game net of similar use. It has for one object to provide a method for attaching a reinforcement such as a tape or analogous member to one edge of the net without weakening the net and without weakening the ropes, cords or threads of which the net is in the main constructed.

Another object is to provide a method for attaching to one edge or one side of a net means for supporting the net without weakening it or the various parts of which it is formed.

Other objects will appear from time to time throughout the specification and claims.

This invention is illustrated more or less diagrammatically in the accompanying drawing, wherein.

Like parts are indicated by like characters throughout the specification and the drawing.

Figure 1:
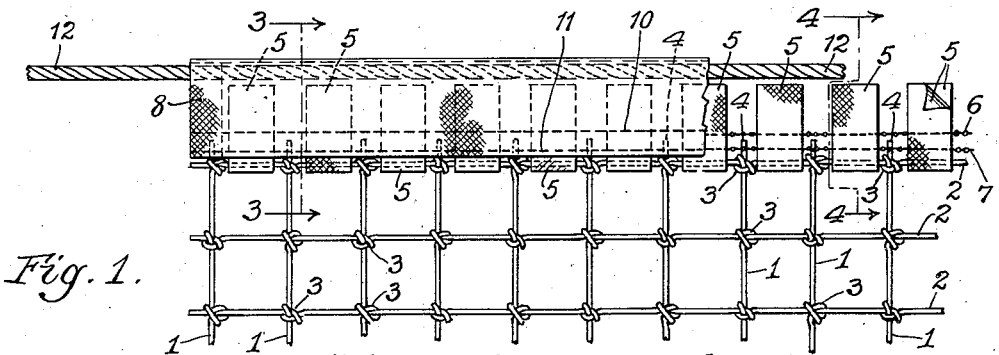
Figure 1 is an elevation of a top or edge of a net with parts removed and parts broken away.

The method of making the net is illustrated in the net as shown herewith. In the particular form shown, the net is formed of transverse cords, threads or strings 1, 1 which are associated with longitudinal cords, threads or strings 2, 2. The transverse and longitudinal cords, threads or strings are joined, for example, by knots 3, 3 at their points of intersection. As shown herewith, a portion or section of net is manufactured by fastening transverse and longitudinal cords, threads or strings together, and preferably short ends 4 of the transverse cords, threads or strings extend outwardly beyond the outermost or uppermost longitudinal member 2.

Figures 4, 5:
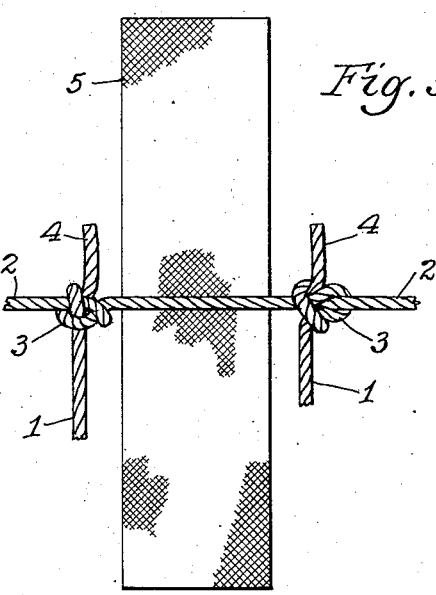
Figure 4 is a transverse section taken on an enlarged scale at line 4—4 of Figure 1.
Figure 5 is a plan view illustrating a portion of the net and a tab at one stage of the manufacture.

After a net of the desired size has been formed, fabric tabs 5 are positioned, preferably one in each mesh, about the uppermost or outermost member 2. The tabs are positioned about the members 2 as shown in Figure 5, and are then folded together to occupy the position shown in Figures 1 and 2.

After the tabs 5 are in position, one or more rows of stitches 6, 7 are formed and as shown particularly in Figures 1, 2, 3 and 4, these rows of stitchings 6, 7 engage the tabs. The uppermost or outermost row of stitching 6 engages only the tabs 5, while the lowermost or innermost row of stitching 7 engages or may engage not only the tabs 5 but also the loose ends 4 of the transverse cords, threads or strings.

Figure 2:
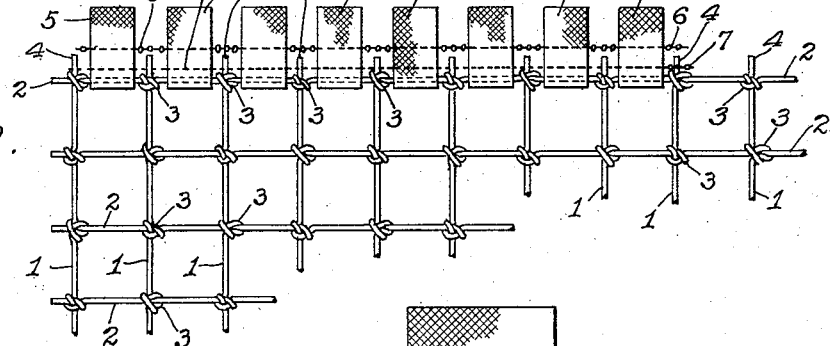
Figure 2 is a view similar to Figure 1, showing the net in an intermediate stage of its manufacture.
Figure 3:
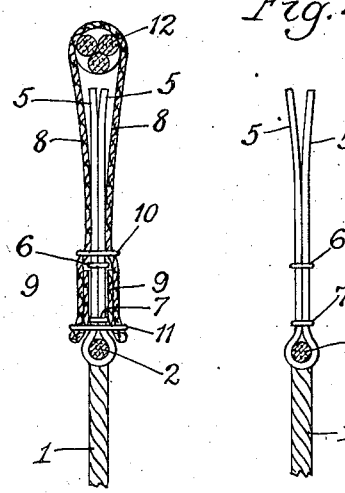
Figure 3 is a transverse sectional detail taken on an enlarged scale at line 3—3 of Figure 1.

After the net as shown in Figure 2 has been made with the tabs 5 in place, a final finishing member may be put in place and if used this member preferably comprises a length of fabric which is folded upon itself to form folds 8, 8, and these folds may have inwardly turned edges 9, 9. The folds are secured to the net by one or more rows of stitching 10, 11. As shown, the uppermost or outermost row of stitching 10 engages the tabs and nothing more, while the innermost or lowermost row of stitching 11 engages the tabs and may also engage the loose ends 4 of the members 1.

If desired, a cord or rope 12 may be positioned between the folds 8, 8, and thus it serves as a means of supporting the net. The rope may be put into place between the folds before they are stitched together, or it may be threaded through after the folds have been stitched together and of course, if desired, the rope 12 may be entirely omitted.

Although I have illustrated the method of my invention in connection with one apparatus, such as a tennis net, it will be recognized that many changes in the form, shape and arrangement of parts and therefore in the method of manufacture of the net can be made without departing from the spirit of the invention and my showing is therefore to be taken as, in a sense, diagrammatic.

In particular, while the method is illustrated in the formation of a net such as may be used for tennis, it may be carried out in connection with nets for other purposes and in fact may be carried out in connection with a net for almost any purpose for which nets are suitable, such as hoisting nets, camouflage nets and many other sorts of nets. The method may also be carried out in connection with almost any form of relatively loosely woven or openly woven fabric in which openings of sufficient size to receive the tabs 5 or members analogous to them are formed, and in the method as carried out on any fabric the tabs 5 or their equivalents are positioned in the open meshes or other openings of almost any fabric and the other steps in forming the particular article illustrated herewith would then be carried out.

One of the main advantages of the method, which is to prevent sewing through cords or threads of a fabric and therefore weakening them, is accomplished in connection with the method when carried out on any of the types of fabric indicated, and the application of the method is therefore not limited to any particular material and the nets or fabrics which are treated according to the method may themselves, of course, be formed of any fibers—animal, vegetable, synthetic, mineral or a mixture of any of them.

This application is a division of my co-pending application Serial No. 488,176, filed May 24, 1943.

The steps in carrying out the method of this invention are as follows:

The net or fabric is formed in any desired manner. It may be formed by weaving or knotting or otherwise. Whatever the form of the fabric, openings or meshes are formed and through these the tabs are positioned. While a tab is shown in each mesh, this is not necessary, and tabs might be positioned only in alternate meshes or only in an occasional mesh. The form of tabs which is to be used will depend largely upon the size and weight of the fabric.

After the fabric has been formed, the desired number of tabs is inserted through the openings or meshes. The tabs are folded together and are then stitched together. One or more rows of stitching may be used. As shown, two have been used, but one may suffice and more than two may be used. It is desirable but not essential that at least one row of stitching be positioned to engage the loose ends 4 of the members 1. Since these loose ends are not ordinarily load-engaging parts, the fact that stitches pass through them and therefore to some degree weaken them is unimportant and does not weaken the structure as a whole.

After the desired rows of stitches have been formed in the tabs, the final covering band is placed in position and is stitched also. The stitches engage the tabs and may, if desired, also engage the loose ends 4. As in the case of the stitches 6 and 7, there may be one row of stitches 11 or 10, or there may be several such rows of stitches.

The tab construction as illustrated herewith is applied only to one edge of the net, but it may be applied to all edges or to more than one. In general, the advantage of the tab construction shown is that it provides means for securing a final edging or band to a structure and for stitching the parts together without forming any stitches which pass through the load-carrying members of the fabric itself, and therefore, without weakening any of the load-carrying members of the fabric.

I claim:

1. The method of forming a fabric article which includes the following steps: preparing the desired amount of large mesh material, inserting tabs of finer mesh fabric through the meshes of said first-mentioned material along its edge, folding said tabs of material upon themselves, forming stitches through said tabs at points positioned away from said edge of said fabric, positioning a strip of reinforcing material over said tabs with the edge of said reinforcing material overlapping said tabs and positioned outwardly from the edge of said fabric, and forming stitches through said reinforcing material and through said tabs.

2. The method of forming a fabric article which includes the following steps: preparing the desired amount of large mesh material, inserting tabs of finer mesh fabric through the meshes of said first-mentioned material along its edge, folding said tabs of material upon themselves, forming stitches through said tabs at points positioned away from said edge of said fabric, positioning a strip of folded reinforcing material over said tabs with the edges of said reinforcing material overlapping said tabs and positioned outwardly from the edge of said fabric, and forming stitches through said reinforcing material and through said tabs.

3. The method of forming a fabric article which includes the following steps: preparing the desired amount of large mesh material, inserting tabs of finer mesh fabric through the meshes of said first-mentioned material along its edge, folding said tabs of material upon themselves, forming a plurality of rows of stitches through said tabs at points positioned away from said edge of said fabric, positioning a strip of reinforcing material over said tabs with the edge of said reinforcing material overlapping said tabs and positioned outwardly from the edge of said fabric, and forming stitches through said reinforcing material and through said tabs.

4. The method of forming a fabric article which includes the following steps: preparing the desired amount of large mesh material, inserting tabs of finer mesh fabric through the meshes of said first-mentioned material along its edge, folding said tabs of material upon themselves, forming stitches through said tabs at points positioned away from said edge of said fabric, positioning a strip of folded reinforcing material over said tabs with the edge of said reinforcing material overlapping said tabs and positioned outwardly from the edge of said fabric, and forming stitches through said reinforcing material and through said tabs.

5. The method of forming a fabric article which includes the following steps: preparing the desired amount of large mesh material, inserting tabs of finer mesh fabric through the meshes of said first-mentioned material along its edge, folding said tabs of material upon themselves, forming a plurality of rows of stitches through said tabs at points positioned away from said edge of said fabric, positioning a strip of reinforcing material over said tabs with the edge of said reinforcing material overlapping said tabs and positioned outwardly from the edge of said fabric, and forming a plurality of stitches through said reinforcing material and through said tabs.

6. The method of forming a fabric article which includes the following steps: preparing the desired amount of large mesh material, inserting tabs of finer mesh fabric through the meshes of said first-mentioned material along its edge, folding said tabs of material upon themselves, forming a plurality of rows of stitches through said tabs at points positioned away from said edge of said fabric, positioning a strip of folded reinforcing material over said tabs with the edges of said reinforcing material overlapping said tabs and positioned outwardly from the edge of said fabric, and forming a plurality of stitches through said reinforcing material and through said tabs.

7. The method of forming a fabric article which includes the following steps: preparing the desired amount of large mesh material, forming said material with the straight edge, inserting tabs of finer mesh fabric through the meshes of said first-mentioned material along its straight edge, folding said tabs of material upon themselves, forming stitches through said tabs at points positioned away from said edge of said fabric, positioning a strip of folded reinforcing material over said tabs with the edges of said reinforcing material overlapping said tabs and positioned outwardly from the edge of said fabric, and forming stitches through said reinforcing material and through said tabs.

8. The method of forming a fabric article which includes the following steps: preparing the desired amount of large mesh material, forming said material with a straight edge, inserting tabs of finer mesh fabric through the meshes of said first-mentioned material along its straight edge, folding said tabs of material upon themselves, forming a plurality of rows of stitches through said tabs at points positioned away from said edge of said fabric, positioning a strip of folded reinforcing material over said tabs with the edges of said reinforcing material overlapping said tabs and positioned outwardly from the edge of said fabric, and forming a plurality of stitches through said reinforcing material and through said tabs.

9. The method of forming a fabric article which includes the following steps: preparing the desired amount of large mesh material, inserting tabs of finer mesh material through the meshes of said first-mentioned material along its edge, folding said tabs of material upon themselves, forming stitches through said tabs at points positioned away from said edge of said material, positioning a strip of folded reinforcing material over said tabs with the edges of said reinforcing material overlapping said tabs and positioned outwardly from the edge of said material, and forming stitches through said reinforcing material and through said tabs.

10. The method of forming a fabric article which includes the following steps: preparing the desired amount of large mesh fabric, inserting tabs of finer mesh fabric through the meshes of said first-mentioned fabric along its edge, folding said tabs of material upon themselves, forming stitches through said tabs at points positioned away from said edge of said large mesh fabric, thereafter positioning a strip of reinforcing material about said tabs with the edge of said reinforcing material overlapping said tabs and positioned outwardly from the edge of said fabric, and forming stitches through said reinforcing material and through said tabs.

11. The method of forming a fabric article which includes the following steps: preparing the desired amount of large mesh fabric, forming said material with a straight edge, inserting tabs of finer mesh fabric through the meshes of said first-mentioned material along its straight edge, folding said tabs of material upon themselves, forming stitches through said tabs at points positioned away from said edge of said large mesh fabric, positioning a strip of folded reinforcing material over said tabs with the edges of said reinforcing material overlapping said tabs and positioned outwardly away from the edge of said large mesh fabric, and forming stitches through said reinforcing material and through said tabs.

MURRAY G. GRABOWSKY.